Feb. 20, 1962 A. C. SAMPIETRO 3,022,114
BRAKE CONTROL SYSTEM
Filed Jan. 31, 1958 2 Sheets-Sheet 1

Inventor
Achilles C. Sampietro
Attys

Feb. 20, 1962  A. C. SAMPIETRO  3,022,114
BRAKE CONTROL SYSTEM
Filed Jan. 31, 1958  2 Sheets-Sheet 2
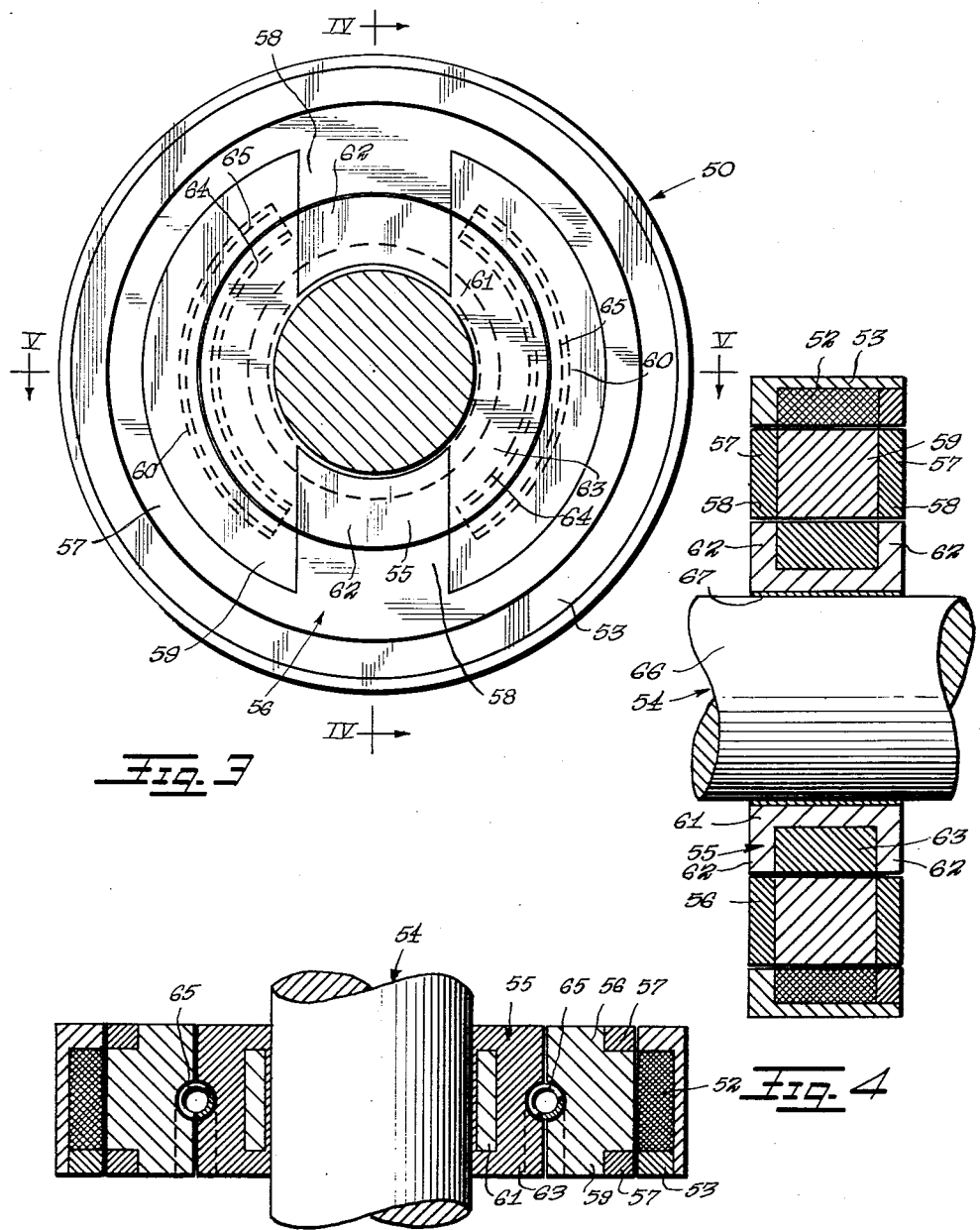
Inventor
Achilles C. Sampietro

United States Patent Office 3,022,114
Patented Feb. 20, 1962

3,022,114
BRAKE CONTROL SYSTEM
Achilles C. Sampietro, Detroit, Mich., assignor to Thompson Ramo Wooldridge Inc., a corporation of Ohio
Filed Jan. 31, 1958, Ser. No. 712,504
14 Claims. (Cl. 303—21)

This invention relates generally to a brake control, and more specifically to an improved brake control for preventing a brake from locking up or skidding a wheel of a moving vehicle.

Although the principles of the present invention may be included in various road and rail vehicles, a particularly useful application is made in automobiles of the type that employ hydraulic fluid actuated brakes. In particular, when such brakes are applied, there is a tendency for the brake system to cause the wheels to skid.

It is well known that a non-rotating sliding wheel reduces the velocity of a vehicle to a lesser extent than one which is being braked to just below the sliding point. It is also well known that a front wheel has less lateral or steering control when such wheel is sliding. Thus maximum deceleration and steerability are obtained when the braking effort does not lock the wheel since a rotating or whirling wheel can exert a larger tangential effort than can a locked wheel. Further, while a whirling wheel has a strong directional sense, and is capable of resisting considerable side thrust, a locked wheel has practically no directional sense and can easily be pushed sideways, thus causing dangerous skidding in cars and loss of direction control.

When a driver exerts a braking effort through a pedal, either with or without power assistance, the vehicle deceleration and the angular deceleration of any one wheel remain proportional to each other until the wheel is locked. At this point, the angular deceleration of the wheel ceases to be proportional to the vehicle deceleration, increasing for an instant, and then dropping to zero. While the wheel skids, the linear deceleration decreases at first and then remains constant.

The present invention contemplates the provision of an anti-skid device which prevents the application of a continuous braking effort which causes the angular wheel deceleration to lose its proportionality to the vehicle deceleration, regardless of the coefficient of friction then prevailing between the wheel and the road or rail, and within the brakes themselves. When the coefficient of friction has a relatively narrow range of variation, an on-off type of control may be utilized. However, when the coefficient of friction has a wide field or range of variation, it is preferable to include elements in the control device which allow or produce proportional control.

Accordingly, it is an object of the present invention to provide a control which prevents either of a pair of vehicle wheels from being skidded by a wheel brake;

Another object of the present invention is to provide a control system for preventing the skidding of a vehicle wheel;

Yet another object of the present invention is to provide an anti-skid control system for a vehicle wheel, wherein the system requires no warm-up time.

Yet another object of the present invention is to provide a system which relieves the braking force at a wheel only by an amount sufficient to terminate the skidding of the wheel relative to a road or rail surface.

Still another object of the present invention is to provide a method for controlling a vehicle brake to limit the skidding thereof with respect to its supporting surface.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

On the drawing:

FIGURE 3 is a view of an angular accelerometer which may be used in the structure of FIGURE 2;

FIGURE 4 is a cross sectional view taken along line IV—IV of FIGURE 3; and

FIGURE 5 is a cross-sectional view taken along line V—V of FIGURE 3.

As shown on the drawing:

Figure 1:
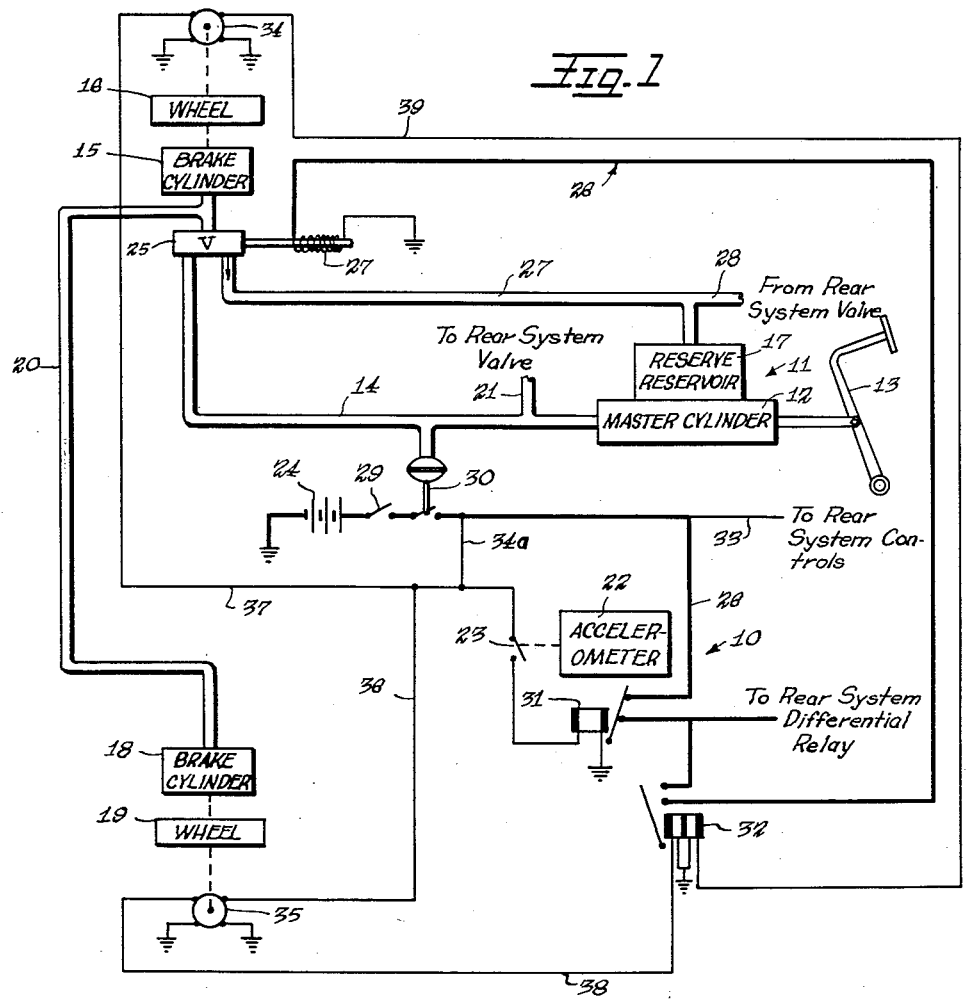
FIGURE 1 is a diagrammatical view of a brake system provided with a brake control in accordance with the principles of the present invention.

The principles of this invention are particularly useful when embodied in a brake control such as illustrated in FIGURE 1, generally indicated by the numeral 10. While the instant control 10 is here shown as being applied to a hydraulic brake system 11, it is to be understood that the principles of the instant invention may be efficiently employed with other brakes as well. The hydraulic system 11, includes a master cylinder 12 which is actuated by a pedal 13 and which has a line 14 which ultimately communicates with a brake cylinder 15 which operates brake shoes within the wheel 16.

The master cylinder 12 has a reserve reservoir 17 in which is disposed brake fluid which is automatically added to the master cylinder 12 as needed. The hydraulic brake system 11 also includes a second brake cylinder 18 which is effective to actuate the brake shoes in the wheel 19, the cylinder 18 being interconnected to the cylinder 15 by a brake line 20.

The brake system 11 thus described is operative to control the brakes for a pair of wheels. It is to be understood that a similar structure may be provided for the rear wheels, their brake line joining with the line 14 by a line 21. Of course, other quantities of brakes would be utilized in vehicles having other than four wheels.

The brake control 10 includes a fluid valve 25 which normally connects the brake line 14 to the brake cylinders 15 and 18. The valve 25 here shown is electrically actuated by a power circuit generally indicated at 26 by which a control signal, the source of which is presently to be described, reaches the coil 27 of the valve 25. When the valve 25 is actuated, the line 14 is thereby blocked off and the brake cylinder 15 is brought into communication with the drain line 27 which communicates with the reserve reservoir 17. A similar drain line 28 is also provided for the rear wheel brake system.

The energy transmitted by the power circuit 26 to operate the coil 27 is termed herein as the "control signal." Of course, if means other than the valve 25 are utilized, the control signal is that signal which relieves the locking of the brake.

The power circuit 26 of the brake control 10 includes, in series, a source of potential, such as a battery 24, a switch 29, a second switch 30, a switch or relay 31, and a differential relay 32.

The switch 29 may be manually controlled, or it may be an automatic overriding switch which cuts out the system under certain conditions. The switch 29 may be connected to the transmission selector control of an automobile so that the system may operate only in the drive range or may be operated by a speed sensing device (not shown).

The switch 30 in the instant embodiment is a pressure operated switch which is actuated by the fluid pressure in the main brake line 14, the switch 30 serving to energize the control system 10 only when the brake pedal 13 is actuated.

The brake control 10 includes a linear accelerometer 22 which is secured to the vehicle in such a manner that it can sense decelerations, especially in a forward direction of vehicle motion. Any linear accelerometer mechanism may be used here which provides a suitable mechanical displacement, the instant accelerometer being mechanically coupled to a switch 23 for providing an electrical signal whenever there is a predetermined amount of deceleration of the vehicle.

Beyond the switch 30, the power circuit divides to provide a pair of similar control circuits 33, 34a for the rear and front brakes respectively. The control circuit 34a is also energized by the pressure switch 30 and energizes the switch 23 so that upon the presence of linear deceleration, the relay 31 is thereby also energized.

The relay 31 is thus under the control of the accelerometer 22 so that it interrupts power to the power circuit 26 whenever there is sufficient linear deceleration. Thus, if the vehicle is decelerating by an amount sufficient to actuate the switch 23, the valve 25 cannot be actuated. However, if the brakes are applied and there is negligible linear deceleration, the substantial absence of such deceleration is thus sensed by the accelerometer 22 which then permits the power circuit to be energized at the relay 31. It is to be understood of course, that the accelerometer 22 and a switch may be used in place of the relay 31 to regulate directly the admission of power to the power circuit 26.

From the relay 31, the power circuit 26 leads to a contact of the differential relay 32, the adjacent contact leading directly to the coil 27 of the valve 25. The operation of the differential relay 32 will now be considered.

Each of the wheels 16 and 19 has a rotary generator-like structure 34 and 35 respectively, each of which is electrically employed in the circuit as a variable impedance. The impedances 34 and 35 each have a portion which is rotatable with the wheels, and have a portion which is stationary. Accordingly, the impedances 34 and 35 comprise means which are rotatable with the wheels and responsive to the rotation thereof, and which transmit an electric signal to indicate such rotation. The impedances are also responsive to changes in the angular velocity. Of course, other variable inductors having a stationary and rotary element may also be used to advance for this purpose.

In this embodiment, the impedances 34 and 35 each have a wound input or field winding, such windings being connected in parallel and being excited by a pair of lines 36 and 37 which communicate with the control line 34a. Thus, the impedances are excited only when the brakes are applied.

The impedances 34 and 35 are matched, and therefore a similar signal will be transmitted by each of them from their output windings which are connected by a pair of lines 38 and 39 respectively to each of a pair of coils within the differential relay 32. Thus, regardless of the speed of rotation of the wheels, a similar signal is transmitted by each of the impedances and hence a similar signal is applied to each part or coil of the differential relay 32.

As the current passes through the coils of the relay 32, magnetic forces are developed in each of the coils, which forces are of opposite polarity and hence the armature of the relay is not closed, whereby the power circuit 26 remains open at the relay 32. However, if one of the wheels 15, 19 is skidding or partially skidding, it then is rotating at a speed which effects a signal which is less than that of the other wheel, and a differential force is developed in the differential relay 32. While previously such forces balanced each other, the slower rotating impedance, in putting out a lower output, serves as a means to upset the balance in the relay, thus causing it to close and the valve 25 to be energized.

Thus, the impedances 34 and 35 each effect and transmit a signal whenever they are excited by the application of the brakes and these output signals are brought together by a means wherein they produce a balanced result and wherein their differences, if any, are converted to a signal directed to relieve the actuating means 15.

Thus also the control 10 includes two branches wherein the inductors 34 and 35 comprise part of each of the branches, the one branch of the electric control circuit being balanced against the other, and being under the dominant control of the linear accelerometer 22.

It can be seen that so long as linear deceleration of the vehicle is present during braking, and so long as the wheels are rotating at the same speed, no relieving of the actuating means or brake cylinder 15 will take place. However, should one of the wheels rotate at a different speed due to partial or total locking of the wheel by the brake, there will be an angular wheel deceleration which is momentarily somewhat larger than the linear acceleration, and thereafter it is somewhat smaller. Accordingly, the proportionality which was present prior to the skidding of the wheel has been destroyed by the skidding. Thus the system senses this disproportionality, and if found, initiates a control signal for relieving the braking force.

If the vehicle is made to decelerate by letting up on the throttle, the accelerometer 22 may operate, but the relay 32 would not operate. Also if the brakes are applied to a stationary vehicle, certain portions of the control system would become energized, but the energy reaching the differential relay 32 would be either negligible or balanced, thus having no effect on the operation.

Accordingly, it can also be seen that none of the components herein require a preliminary warm-up and so the entire system will respond instantaneously or be ready for response whenever the pedal 13 is actuated.

If desired, the exciting windings of the wheel impedances may be continuously energized. However, if this is done, continuous duty impedances and a continuous duty differential relay 32 would be required.

Figure 2:
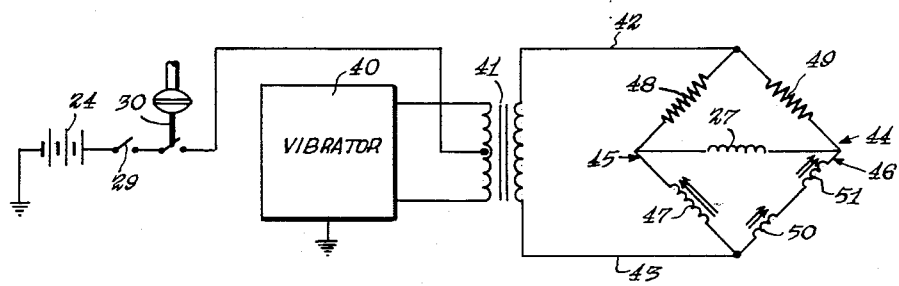
FIGURE 2 is a circuit diagram illustrating a modification which may be applied to the structure of FIGURE 1.

Referring now to FIGURE 2, there is shown a slightly modified form of control circuit which may be used where proportional control is desired, particularly where the coefficients of friction involved are subject to a range of variation.

As in FIGURE 1, the power source 24 is under the control of the switch 29 and the brake actuated switch 30. Where the source of power 24 delivers direct current, it is necessary to use a vibrator 40 together with a transformer 41 to provide a source of alternating current in the lines 42 and 43. The lines 42 and 43 provide potential to a bridge circuit generally indicated at 44, the circuit 44 in the instant embodiment comprising a Wheatstone bridge.

The bridge 44 includes a pair of branches 45 and 46 which are each connected across the source of alternating current 41. The coil 27 of the valve 25 is connected as a bridge between the branches 45 and 46. A variable inductor or impedance 47 is provided in the branch 45, its core being shiftable by the accelerometer 22 in response to linear deceleration of the vehicle. The impedance 47 thus is infinitely variable and operates on a self-inductance principle. A resistor 48, which may be either fixed or variable, is also included in the branch 45 to balance the bridge circuit. The branch 46 includes a second resistor 49 and either one or two variable inductors or impedances 50 and 51. The impedances 50 and 51 also operate on the self-inductance principle, and are actuated by angular accelerometers disposed in association with the wheels 16 and 19 in place of the impedances 34 and 35.

If the bridge circuit is used to control only one wheel, one of the impedances 50 and 51 may be omitted. However, two such impedances are required when the bridge 44 control the brakes for two wheels. It is to be understood that a relay coil may be substituted for the coil 27, with power provided through the relay contacts to operate the valve 25.

Referring now to FIGURES 3-5, an angular accelerometer is shown which may be utilized to operate the impedances 50 and 51. The impedance 50 includes a helical coil 52 which is supported in a circular channel member 53. The channel member 53 is a stationary element within which a rotary element generally indicated at 54 is caused to rotate. The rotary element 54 includes a driven portion 55 which is corotatable with one of the wheels 16 and 19. The rotary element 54 also includes an inertial portion 56 disposed intermediate the driven portion 55 and the coil 52. The portion 56 includes a pair of spaced steel rings 57, 57 having a pair of inwardly and radially directed arms 58, 58. The rings 57 are spaced apart and supported by a non-magnetic matrix portion 59 which has a pair of inwardly facing grooves 60, 60.

The driven portion 55 includes an imbedded steel cylindrical ring 61 having two pairs of radially outwardly extending arms 62 which register with the radial portions 58 of the rings 57, 57. The steel ring 61 and radial arms 62 are supported by a non-magnetic matrix member 63 which may be attached by any convenient means for rotation by the wheel. The matrix member 63 includes a pair of radially outwardly directed grooves 64, 64 which register with the grooves 60, 60. Each pair of grooves 60 and 64 receives a compression spring 65 therebetween so that upon rotation of the inertial member 56 with respect to the driven member 55, the springs 65 are compressed. If desired, the interface between the driven member 55 and the inertial member 56 may be covered with Teflon or with any other material which insures low friction between these elements. The accelerometer may also include a shaft 66 which, if it is made of steel, preferably is magnetically insulated by an inner part of the matrix member 63, as at 67, from the ring 61.

As best seen in FIGURE 3, the ring 57 of the inertial element 56 is in effect a magnetic core for the coil 52. Whether the ring rotates or is relatively stationary, it is apparent that it aids the self-inductance of the coil 52 to the same extent. However, if the inertial ring 56 is arcuately or angularly displaced with respect to the magnetic ring 61, such displacement will vary the magnetic flux passing through the arms 58 and 62 and thereby vary the self-inductance and impedance as a function of the angular displacement between these arms. For any constant velocity, the relative position of the arms will be maintained by the springs 65 as shown in FIGURE 3. However, since the moment of inertia of the outer or inertial ring 56 is greater than that of the inner ring 61, any acceleration or deceleration will be sensed as an angular displacement.

It is to be understood that the impedances 50 and 51 may be of any construction wherein change of angular acceleration in a rotating wheel may be sensed electrically.

Referring again to FIGURE 2, this circuit therefore includes a means which is rotatable with the wheels and which is responsive to the rotation thereof, and which provides an electrical signal from an impedance operating on the self-inductance principle, the signal being infinitely variable and proportional to the angular acceleration or deceleration of the wheel with which it is associated. The electrical portion of this means is disposed within one branch 46 of the bridge 44 whereby a change in impedance in only one branch upsets the balance of the bridge. However, if a linear deceleration simultaneously occurs which is proportional to the angular deceleration, a condition which can only occur when the brakes are being applied and when there is no skidding, the bridge 44 is not unbalanced.

Thus the signals from the angular accelerometers are balanced by the electrical bridge, the bridge combining the signals from the various accelerometers to form a signal which can control the actuating means 15. Thus the bridge 44 is an electric control circuit having two branches, one balanced against the other, with impedances forming parts of the branches, and with the bridge under the control of a linear accelerometer. Thus also the bridge with its components comprises a means for sensing angular wheel decelerations which are disproportionately larger than the linear decelerations, and which provides a control signal in response thereto.

The control signal from the bridge 44 may be used to operate the valve 25 in an on-off fashion by employing a relay as the bridging element in the bridge 44. However, where no intermediate relay is used, a modulating valve 25 may be used to initially fully close off the brake line 14 and to vent the brake cylinder 15 to the drain line 27' by a variable amount or rate dependent upon the degree of unbalance of the bridge 44.

It is to be understood that the principles of this invention may be utilized in various brake control circuits, such circuits having various components and elements incorporated therein. Accordingly, this invention also includes the methods for effecting the foregoing results. It is now apparent that angular wheel decelerations are sensed and that a signal is provided in response thereto. Also, linear decelerations are sensed and a signal is provided in response thereto. Since it is the disproportionality in these two signals which are used for control purposes, the disproportionality between the angular wheel deceleration and the linear vehicle deceleration may also be sensed to provide a control signal. The various acceleration signals are combined to produce a joint effect which is normally balanced out but which is effective, when said signals are disproportionate, to produce a control signal.

Stated otherwise, the method involves the balancing of angular wheel deceleration signals under the control of linear deceleration signals. Thus, an unbalancing is produced by the tendency of a wheel to skid to produce a control signal. The control signal is utilized to relieve the actuating means. This includes the blocking of the fluid flow out of the main brake line, and permitting fluid to drain from the actuating means. The removal of this signal permits fluid flow within the brake line 14 and blocks fluid drainage.

While impedances have been used in the bridge disclosed herein to avoid sliding contacts, it is to be understood that potentiometers may also be used, either in a D.C. bridge or in an A.C. bridge.

Although various modifications might be suggested by those versed in the art, it should be understood that I wish to embody within the scope of the patent warranted hereon all such embodiments as reasonably and properly come within the scope of my contribution to the art.

I claim as my invention:

1. A control system for preventing either of a pair of vehicle wheels from being skidded by its wheel brake, said control system comprising in combination: brake-actuating means adapted to be connected to the wheel brakes; a linear accelerometer adapted to be secured to the vehicle and to be disposed to be responsive to deceleration of the vehicle in the direction of linear movement of the wheels; means for each of the wheels, having an element adapted to be mounted for corotation therewith, said means being responsive to the angular deceleration thereof, and each being adapted to indicate angular wheel deceleration with a signal; means connecting said deceleration indicating means, said linear accelerator, and said brake-actuating means in such manner as to normally balance said signals and to place the brake-actuating means in normal operating condition; said connecting means, under the control of said linear accelerometer, being operative on the brake-actuating means to effect release thereof when one of said signals becomes unbalanced due to loss of angular wheel velocity.

2. A control system for preventing either of a pair of vehicle wheels from being skidded by its wheel brake, said control system comprising in combination: brake-actuating means adapted to be connected to the wheel brakes; a linear accelerometer adapted to be secured to the vehicle and to be disposed to be responsive to deceleration of the vehicle in the direction of linear movement of the wheels, and operative to provide an electrical indication signal thereof; means for each of the wheels, having an element adapted to be mounted for corotation therewith, said means being responsive to the angular deceleration thereof, and each being adapted to indicate angular wheel deceleration with an electrical signal; and means electrically connecting said angular deceleration indicating means, said linear accelerometer, and said brake-actuating means in such manner as to normally effectively balance out said signals to thereby have no effect on the brake-actuating means, and as to be operative on the brake-actuating means to relieve braking when one of said signals becomes unbalanced due to loss of angular wheel velocity.

3. A control system for preventing either of a pair of vehicle wheels from being skidded by its wheel brake, said control system comprising in combination: brake-actuating means adapted to be connected to the wheel brakes; a linear accelerometer adapted to be secured to the vehicle and to be disposed to be responsive to deceleration of the vehicle in the direction of linear movement of the wheels; means for each of the wheels, having an element adapted to be mounted for corotation therewith, said means being responsive to the angular deceleration thereof, and each being adapted to indicate angular wheel deceleration with a signal; and an electrical control circuit including said angular wheel deceleration indicating means, said circuit comprising two branches, each of which during brake actuation is balanced against the other in the absence of any skidding; said angular wheel deceleration indicating means in one of said branches being responsive to any excessive loss of angular wheel velocity created by wheel skidding to upset said balance; said linear accelerometer being connected in said control circuit to define which of said velocity losses are excessive; said circuit being connected to the brake-actuating means for relieving it in response to the upset of said balance.

4. A control system for preventing either of a pair of vehicle wheels from being skidded by its wheel brake, said control system comprising in combination: brake-actuating means adapted to be connected to the wheel brakes; a linear accelerometer adapted to be secured to the vehicle and to be disposed to be responsive to deceleration of the vehicle in the direction of linear movement of the wheels; a pair of variable impedances for the wheels, each of said impedances having a stationary and a rotary element, said rotary element being adapted to be driven by the wheel, said variable impedances each having an output the magnitude of which is affected by angular wheel deceleration; and an electrical control circuit including said linear accelerometer and said variable impedances, said circuit comprising two branches, each of which during brake actuation is balanced against the other in the absence of any skidding; said impedances comprising parts of at least one of said branches; the effectiveness of said control circuit being under the control of said accelerometer; said control circuit being operatively connected to the brake-actuating means for relieving it in response to unbalance in said branches when the brakes are being applied.

5. A control system for preventing either of a pair of a vehicle wheels from being skidded by its wheel brake, said control system comprising in combination: brake-actuating means adapted to be connected to the wheel brakes; a linear accelerometer adapted to be secured to the vehicle and to be disposed to be responsive to deceleration of the vehicle in the direction of linear movement of the wheels; a pair of variable impedances for the wheels, each of said impedances having a stationary and a rotary element, said rotary element being adapted to be driven by the wheel, said variable impedances each having an output the magnitude of which is affected by angular wheel deceleration; and an electrical control circuit including said linear accelerometer and said variable impedances, said circuit comprising two branches, each of which during brake actuation is balanced against the other in the absence of any skidding; said impedances comprising parts of at least one of said branches; the effectiveness of said control circuit being under the control of said accelerometer; said control circuit being operatively connected to the brake-actuating means for relieving it; said circuit being so arranged that coexistence of angular wheel deceleration and negligible vehicle deceleration upsets said balance of said branches to effect said relieving of said brake-actuating means.

6. A control system for preventing either of a pair of vehicle wheels from being skidded by its wheel brake, said control system comprising in combination: brake-actuating means adapted to be connected to the wheel brakes; normally non-energized means for electrically sensing angular wheel decelerations which are disproportionate to the linear decelerations of the vehicle, said means when energized and operated indicating said disproportionality with an electrical control signal; normally non-operable means responsive to said control signal, when in operable condition and operated, for relieving the brake-actuating means; and switch means operative in response to each operation of said brake-actuating means to energize said sensing means and to place said relieving means in operable condition.

7. A method for preventing either of a pair of vehicle wheels from being skidded by a wheel brake having an actuating means, comprising the steps of: providing a pair of normally balanced signals; sensing the presence and substantial absence of linear vehicle deceleration; simultaneously sensing any angular deceleration of one of the wheels and providing an indication thereof; using the indication during the absence of linear deceleration to provide an unbalance of the normally balanced signals and to thereby provide a control signal, and utilizing said control signal to relieve the actuating means.

8. A method for preventing either of a pair of vehicle wheels from being skidded by a wheel brake having an actuating means, comprising the steps of: providing a signal in response to linear deceleration of the vehicle; providing other signals in response to angular wheel decelerations; normally balancing the wheel deceleration signals and utilizing any unbalance of said wheel signals when said linear deceleration signal is negligible to effect relief of the actuating means.

9. A control for preventing either of a pair of vehicle wheels from being skidded by a wheel brake, said control comprising in combination: a brake-actuating means; an angular accelerometer for each of the wheels and responsive to the angular deceleration thereof, said accelerometer indicating angular deceleration with an electrical signal which is a function thereof; a linear accelerometer responsive to vehicle deceleration; said accelerometer indicating linear deceleration with an electrical signal which is a function thereof; an electrically responsive means for relieving the brake actuating means; and an electrical bridge having two branches, said angular and linear accelerometers being in opposite branches, and said relieving means bridging said branches.

10. A control for preventing a vehicle wheel from being skidded by a wheel brake, said control comprising in combination: a brake-actuating means; an angular accelerometer for the wheel and responsive to the angular deceleration thereof, said accelerometer indicating angular deceleration with an electrical signal which is a function thereof; a linear accelerometer responsive to vehicle deceleration, said accelerometer indicating linear deceleration with an electrical signal which is a function thereof; an electrically responsive means for relieving the brake actuating means; and an electrical bridge having two branches, said angular and linear accelerometers being in opposite branches, and said relieving means bridging said branches.

11. A control for preventing a vehicle wheel from being skidded by a wheel brake, said control comprising in combination: a brake-actuating means; an angular accelerometer for the wheel and responsive to the angular deceleration thereof; a linear accelerometer responsive to vehicle deceleration; an electrically responsive means for relieving the brake actuating means; and an electrical bridge having two branches, said accelerometers each having an inductor connected in opposite branches of said bridge, said inductors being variable as a function of deceleration, and said relieving means bridging said branches.

12. A control for preventing a vehicle wheel from being skidded by a wheel brake, said control comprising in combination: a brake-actuating means; an angular accelerometer for the wheel and responsive to the angular deceleration thereof; a linear accelerometer responsive to vehicle deceleration; an electrically responsive means for relieving the brake actuating means; an alternating current source; and an electrical bridge having two branches connected across said current source, said accelerometers each having an impedance connected in opposite branches of said bridge, said impedances being variable as a function of deceleration; and said relieving means bridging said branches.

13. A control system for preventing either of a pair of vehicle wheels from being skidded by its wheel brake, said control system comprising in combination: brake-actuating means adapted to be connected to the wheel brakes; a linear accelerometer adapted to be secured to the vehicle and to be disposed to be responsive to deceleration of the vehicle in the direction of linear movement of the wheels, and operative to provide an electrical indication signal thereof; means for each of the wheels, having an element adapted to be mounted for corotation therewith, said means being responsive to the angular deceleration thereof, and each being adapted to indicate angular wheel deceleration with an electrical signal; and electrical connecting means including a differential relay having a pair of coils each adapted to be energized in a balanced manner through one of said angular wheel deceleration indicating means, said relay when unbalanced being operative to supply power to the brake-actuating means, subject to the control of said linear accelerometer signal, for the relief thereof due to an unbalanced loss of angular wheel velocity.

14. A control system for preventing either of a pair of vehicle wheels from being skidded by its wheel brake, said control system comprising in combination: brake-actuating means adapted to be connected to the wheel brakes, and including electrically responsive means for relief thereof; a linear accelerometer adapted to be secured to the vehicle and to be disposed to be responsive to deceleration of the vehicle in the direction of linear movement of the wheels, and operative to provide an electrical indication signal thereof; rotary impedance means for each of the wheels, having an element adapted to be mounted for corotation therewith, said means being responsive to the angular deceleration thereof, and each being adapted to indicate angular wheel deceleration with an electrical signal; a differential relay having a pair of coils each adapted to be energized in a balanced manner through one of said rotary impedance means; and a power circuit for said relieving means, said circuit being under the control of said linear accelerometer and said differential relay, and operative during negligible linear deceleration when said differential relay is actuated.

References Cited in the file of this patent
UNITED STATES PATENTS

| | | |
|---|---|---|
| 2,170,237 | Farmer et al. | Aug. 22, 1939 |
| 2,529,985 | Williams | Nov. 14, 1950 |
| 2,907,607 | Williams | Oct. 6, 1959 |
| 2,933,161 | Hebberling et al. | Apr. 19, 1960 |

FOREIGN PATENTS

| | | |
|---|---|---|
| 1,139,440 | France | Feb. 11, 1957 |

OTHER REFERENCES

Hebberling et al.: German application, Ser No. W14238, printed January 26, 1956 (Kl.20f 49).